United States Patent
Choi et al.

(10) Patent No.: US 10,071,662 B2
(45) Date of Patent: Sep. 11, 2018

(54) HINGE UNIT OF CONSOLE ARMREST FOR VEHICLE

(71) Applicant: Seoyon E-Hwa Co., Ltd., Seoul (KR)

(72) Inventors: Bong Joo Choi, Chungcheongnam-do (KR); Yong Su Lee, Chungcheongnam-do (KR)

(73) Assignee: Seoyon E-Hwa Co., Ltd., Seoul (KR)

( * ) Notice: Subject to any disclaimer, the term of this patent is extended or adjusted under 35 U.S.C. 154(b) by 0 days.

(21) Appl. No.: 15/458,148

(22) Filed: Mar. 14, 2017

(65) Prior Publication Data

US 2018/0100336 A1    Apr. 12, 2018

(30) Foreign Application Priority Data

Oct. 10, 2016    (KR) .......................... 10-2016-0130674

(51) Int. Cl.
*B60N 2/46*    (2006.01)
*B60N 2/75*    (2018.01)
(Continued)

(52) U.S. Cl.
CPC ............. *B60N 2/767* (2018.02); *B60N 2/753* (2018.02); *B60N 2/793* (2018.02); *E05D 3/02* (2013.01);
(Continued)

(58) Field of Classification Search
CPC ........ B60N 2/767; B60N 2/753; B60N 2/793; E05D 11/0054; E05D 2011/0072;
(Continued)

(56) References Cited

U.S. PATENT DOCUMENTS

| 4,435,011 A * | 3/1984 | Hakamata | B60N 2/757 297/113 |
| 6,652,032 B2 * | 11/2003 | Laval | B60N 2/793 297/411.32 |

(Continued)

FOREIGN PATENT DOCUMENTS

| KR | 20070095538 A | 10/2007 |
| KR | 100867707 | 11/2008 |
| KR | 100883745 B1 | 2/2009 |

OTHER PUBLICATIONS

European Search Report dated Sep. 29, 2017 for EP Application No. 17158325.5.
(Continued)

*Primary Examiner* — Jeffrey O'Brien
(74) *Attorney, Agent, or Firm* — Harness, Dickey & Pierce, P.L.C.

(57) ABSTRACT

Disclosed herein is a hinge unit of a console armrest for a vehicle, which includes an upper bracket including an armrest installation part coupled to an armrest, and upper hinge parts formed at both sides of the armrest installation part, each having a first upper hinge hole, a lower bracket including a console installation part coupled to a console, and lower hinge parts formed at both sides of the console installation part, each having a first lower hinge hole, an upper bracket cover configured to surround at least a portion of each of the upper hinge parts and to have a second upper hinge hole formed at a position corresponding to the first upper hinge hole, and a lower bracket cover configured to surround at least a portion of each of the lower hinge parts and to have a second lower hinge hole.

10 Claims, 9 Drawing Sheets

(51) Int. Cl.
  *E05D 3/02* (2006.01)
  *E05D 11/00* (2006.01)
  *E05F 1/12* (2006.01)
  *B60R 7/04* (2006.01)

(52) U.S. Cl.
  CPC ........ *E05D 11/0054* (2013.01); *E05F 1/1223* (2013.01); *B60R 7/04* (2013.01); *E05Y 2201/11* (2013.01); *E05Y 2900/538* (2013.01)

(58) Field of Classification Search
  CPC .. E05D 9/00; E05D 9/005; E05D 5/06; E05D 5/062; E05D 2005/067; E05D 11/08
  See application file for complete search history.

(56) References Cited

U.S. PATENT DOCUMENTS

| | | | | |
|---|---|---|---|---|
| 6,832,412 B2 * | 12/2004 | Kim | ...................... | E05F 1/1215 16/354 |
| 6,883,871 B2 * | 4/2005 | Nae | ........................ | B60N 2/777 297/411.32 |
| 7,100,242 B2 * | 9/2006 | Maierholzner | ........ | B60N 2/933 16/319 |
| 7,108,318 B2 * | 9/2006 | Himmelhuber | ........ | B60N 2/757 297/115 |
| 7,108,328 B2 * | 9/2006 | Himmelhuber | ........ | B60N 2/767 297/411.38 |
| 7,178,197 B2 * | 2/2007 | Verheye, Sr. | ....... | E05D 11/0054 16/250 |
| 7,677,639 B2 * | 3/2010 | Cafeo | ................... | E05D 7/0018 296/146.11 |
| 7,766,408 B2 * | 8/2010 | Lota | ......................... | B60R 7/04 296/37.1 |
| 7,987,554 B2 * | 8/2011 | Hakamata | ............... | E05D 5/062 16/250 |
| 8,752,245 B2 * | 6/2014 | Duffy | ........................ | E05D 3/02 16/223 |
| 8,944,512 B2 * | 2/2015 | Girbinger | ............ | B60N 2/4633 297/411.38 |
| 9,435,151 B2 * | 9/2016 | Tanabe | ................ | E05D 11/0054 |
| 9,731,655 B2 * | 8/2017 | Nakasone | ............. | E05D 11/081 |
| 2012/0261970 A1 * | 10/2012 | Girbinger | ............ | B60N 2/4633 297/411.38 |
| 2017/0282761 A1 * | 10/2017 | Gillis | ..................... | B60N 2/793 |
| 2017/0334323 A1 * | 11/2017 | Stuiber | ................ | B60N 2/4606 |

OTHER PUBLICATIONS

Korean Office Action dated Mar. 21, 2018 from corresponding Korean Application No. 10-2016-0130674, including English translation.

* cited by examiner

HINGE UNIT OF CONSOLE ARMREST FOR VEHICLE

CROSS-REFERENCE(S) TO RELATED APPLICATIONS

This application claims priority to Korean Patent Application No. 10-2016-0130674, filed on Oct. 10, 2016, the disclosure of which is incorporated herein by reference in its entirety.

BACKGROUND OF THE INVENTION

Field of the Invention

Exemplary embodiments of the present invention relate to a hinge unit of a console armrest for a vehicle, and more particularly, to a hinge unit of a console armrest for a vehicle, which is capable of improving opening and closing operation of an armrest.

Description of the Related Art

In general, a console armrest is configured to install an armrest (see reference numeral 2 in FIG. 7) at the upper end of a console (see reference numeral 1 in FIG. 7) that is provided to store vehicle occupant's goods so that a driver can place her/his arm on the armrest.

In this case, a hinge unit of a console armrest for a vehicle includes a lower bracket that is fixedly coupled to a console, an upper bracket that is fixedly coupled to an armrest, and a hinge shaft that couples the lower bracket and the upper bracket with a hinge. The hinge unit is configured such that the upper bracket rotates about the lower bracket, when the armrest is unlatched and then opened, in order to utilize a storage space in the console.

In this context, the above related art is disclosed, for example, in Korean Patent Publication No. KR10-0867707B1 (Patent Document 1).

Patent Document 1 relates to a hinge unit of a console armrest for a vehicle, which includes an upper bracket of an armrest, a lower bracket of a console, a hinge pin, a spring, and an auxiliary bracket that is located between the upper bracket and the lower bracket while having a protect part, a latch jaw, a fitting bush, and a latch. This Patent Document 1 discloses a technique that controls the opening speed of the armrest to improve an open feeling and prevents deformation of the brackets to achieve a reduction in strange noise generated during the opening and closing of the armrest and an improvement in durability.

However, Patent Document 1 does not disclose a guide structure that enables the upper bracket to be pressed against the lower bracket and to stably rotate relative thereto when the armrest is opened.

Moreover, it does not disclose a guide structure that functionally allows the upper bracket to be in a fully open/closed state.

SUMMARY OF THE INVENTION

An object of the present invention is to provide a hinge unit of a console armrest for a vehicle, which has a guide structure that enables an upper bracket to be pressed against a lower bracket and to stably rotate relative thereto when an armrest is opened.

Another object of the present invention is to provide a hinge unit of a console armrest for a vehicle, which has a guide structure that functionally allows an upper bracket to be in a fully open/closed state.

A further object of the present invention is to provide a hinge unit of a console armrest for a vehicle, which is capable of remarkably reducing an abrasion phenomenon due to friction between an upper bracket and a lower bracket.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a hinge unit of a console armrest for a vehicle includes an upper bracket including an armrest installation part fixedly coupled to an armrest, and upper hinge parts formed at both sides of the armrest installation part while extending therefrom, each of the upper hinge parts having a first upper hinge hole through which a hinge shaft passes, a lower bracket including a console installation part fixedly coupled to a console, and lower hinge parts formed at both sides of the console installation part while extending therefrom, each of the lower hinge parts having a first lower hinge hole formed at a position corresponding to the first upper hinge hole, the hinge shaft passing through the first lower hinge hole, an upper bracket cover configured to surround at least a portion of each of the upper hinge parts of the upper bracket and to have a second upper hinge hole formed at a position corresponding to the first upper hinge hole, and a lower bracket cover configured to surround at least a portion of each of the lower hinge parts of the lower bracket and to have a second lower hinge hole formed at a position corresponding to the first lower hinge hole, wherein the upper bracket cover and the lower bracket cover guide relative rotation between the upper bracket and the lower bracket while coming into contact with each other.

The upper bracket cover may include a guide protrusion protruding toward the lower bracket cover, the lower bracket cover may include a guide jaw for guiding the guide protrusion during the rotation of the upper bracket.

The guide jaw may have an arc shape that is centered on the second lower hinge hole.

The guide jaw may include inclined jaws formed at both ends thereof such that a user feels that the guide protrusion is latched by the inclined jaws, and seating jaws extending from the respective inclined jaws to seat and support the guide protrusion, thereby allowing the upper bracket to be in a fully open state or in a fully closed state, the inclined jaws being paired with the seating jaws.

The guide protrusion may be more convex at both ends thereof than a central portion thereof so as to be held in and supported by the seating jaws.

The hinge unit may further include a spring directly or indirectly installed to the hinge shaft to apply opening rotational force during opening of the upper bracket.

The spring may be rotatable along with the rotation of the upper bracket.

The respective upper hinge parts of the upper bracket may have first spring fixing holes that are symmetrical, the respective upper bracket covers may have second spring fixing holes that are symmetrically formed at positions corresponding to the first spring fixing holes, and the spring may be assembled in such a manner that both ends thereof pass through the first and second spring fixing holes.

The upper bracket may be made of a steel material, the upper bracket cover may be made of a plastic material, and the upper bracket and the upper bracket cover may be integrally manufactured by insert molding.

The lower bracket may be made of a steel material, the lower bracket cover may be made of a rubber material, and the lower bracket and the lower bracket cover may be integrally manufactured by insert molding.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

The drawings are not necessarily to scale and in some instances, proportions may have been exaggerated in order to clearly illustrate features of exemplary embodiments. In addition, the terms used in the specification are terms defined in consideration of functions of the present invention, and these terms may vary with the intention or practice of a user or an operator. Therefore, these terms should be defined based on the entire content disclosed herein. Meanwhile, the following embodiments are for the purpose of describing the components set forth in the appended claims only and are not intended to limit the spirit and scope of the invention.

Figure 1:
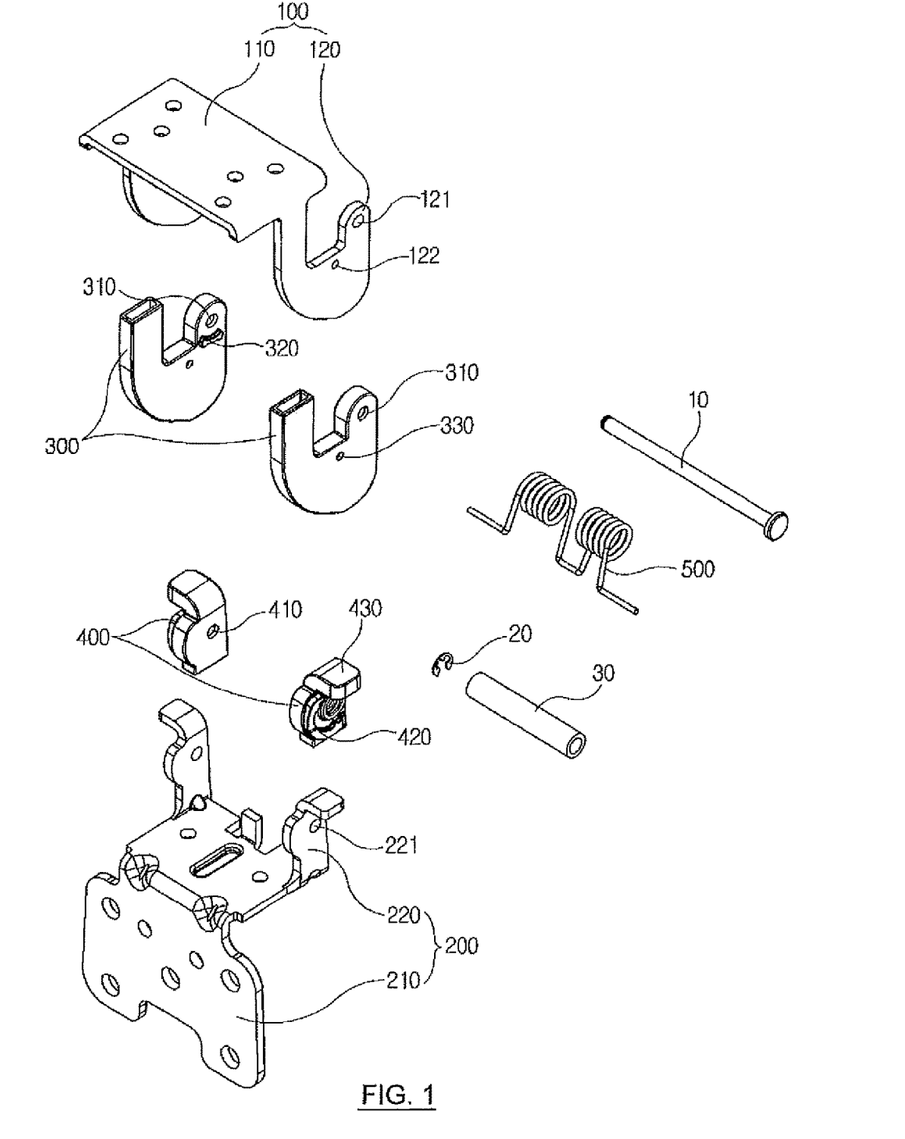
FIG. 1 is an exploded perspective view illustrating a hinge unit of a console armrest for a vehicle according to an embodiment of the present invention.
Figure 2:
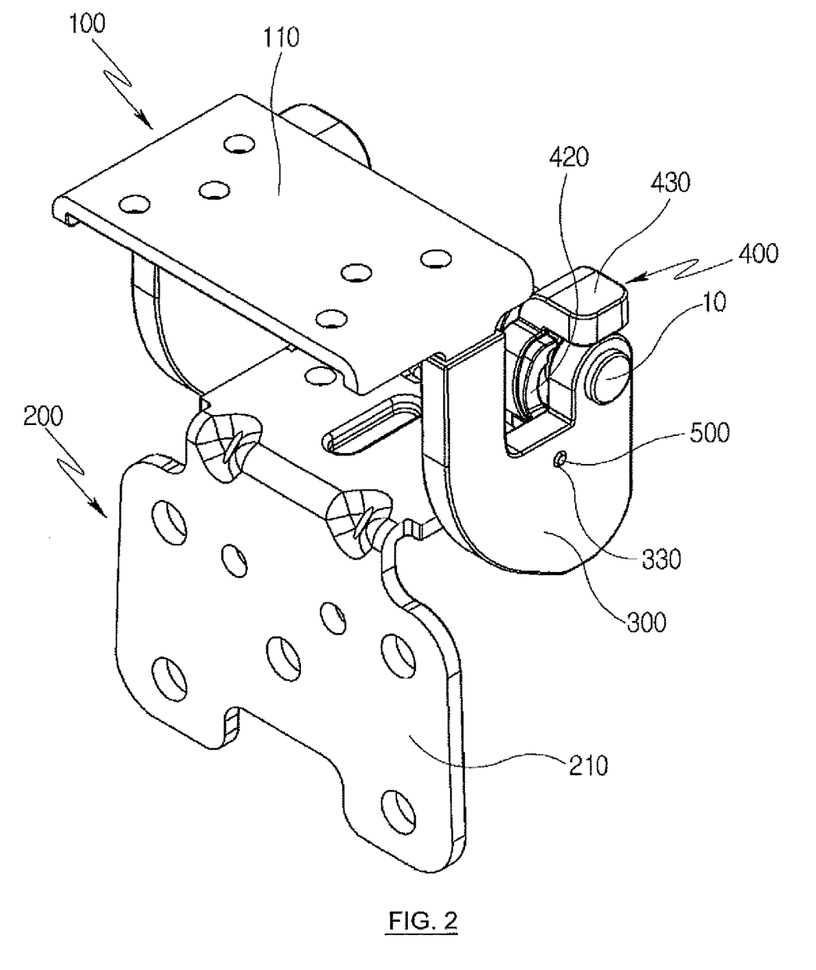
FIG. 2 is an assembled perspective view of the hinge unit of a console armrest for a vehicle illustrated in FIG. 1.
Figure 3:
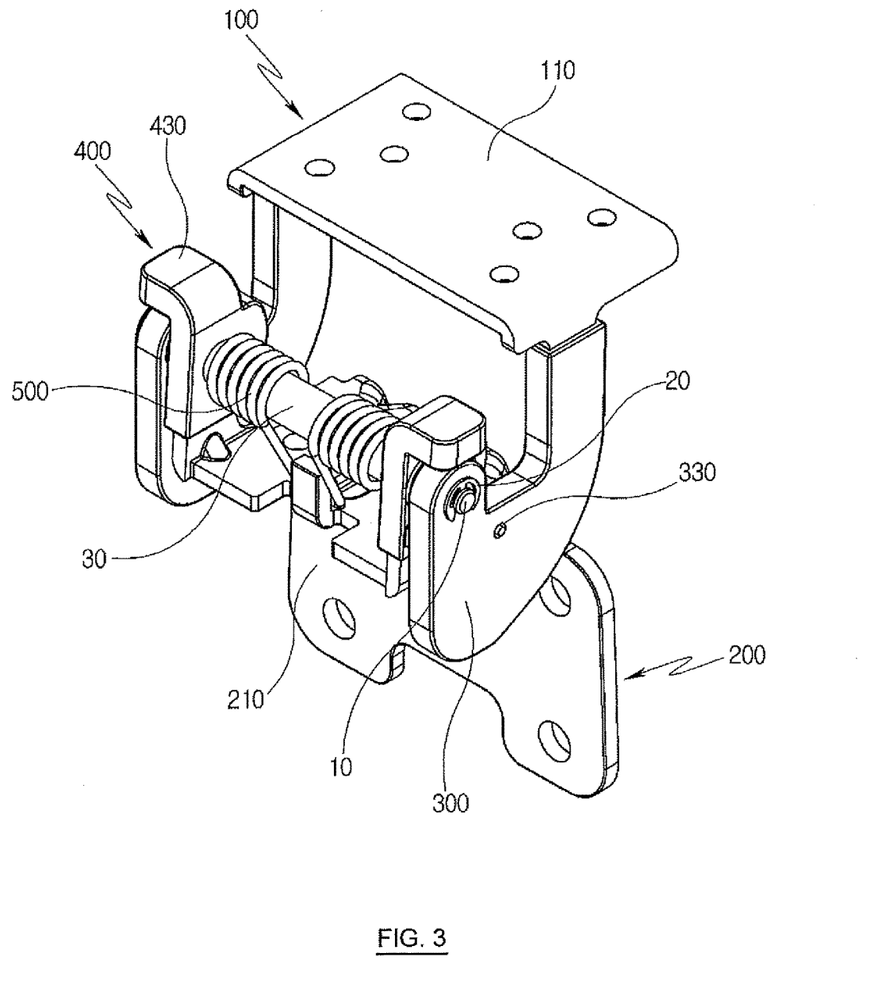
FIG. 3 is an assembled perspective view of the hinge unit of a console armrest for a vehicle illustrated in FIG. 2 when viewed from a different angle.
Figure 4:
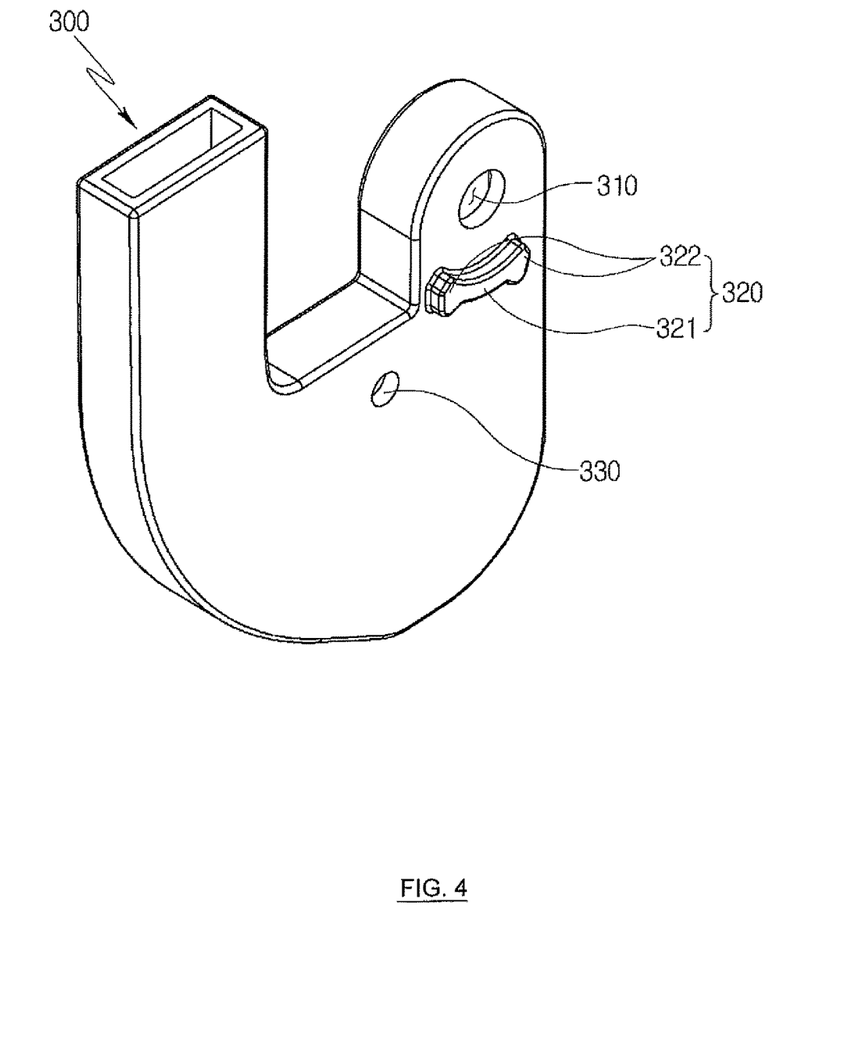
FIG. 4 is an enlarged perspective view of an upper bracket cover illustrated in FIG. 1.
Figure 5:
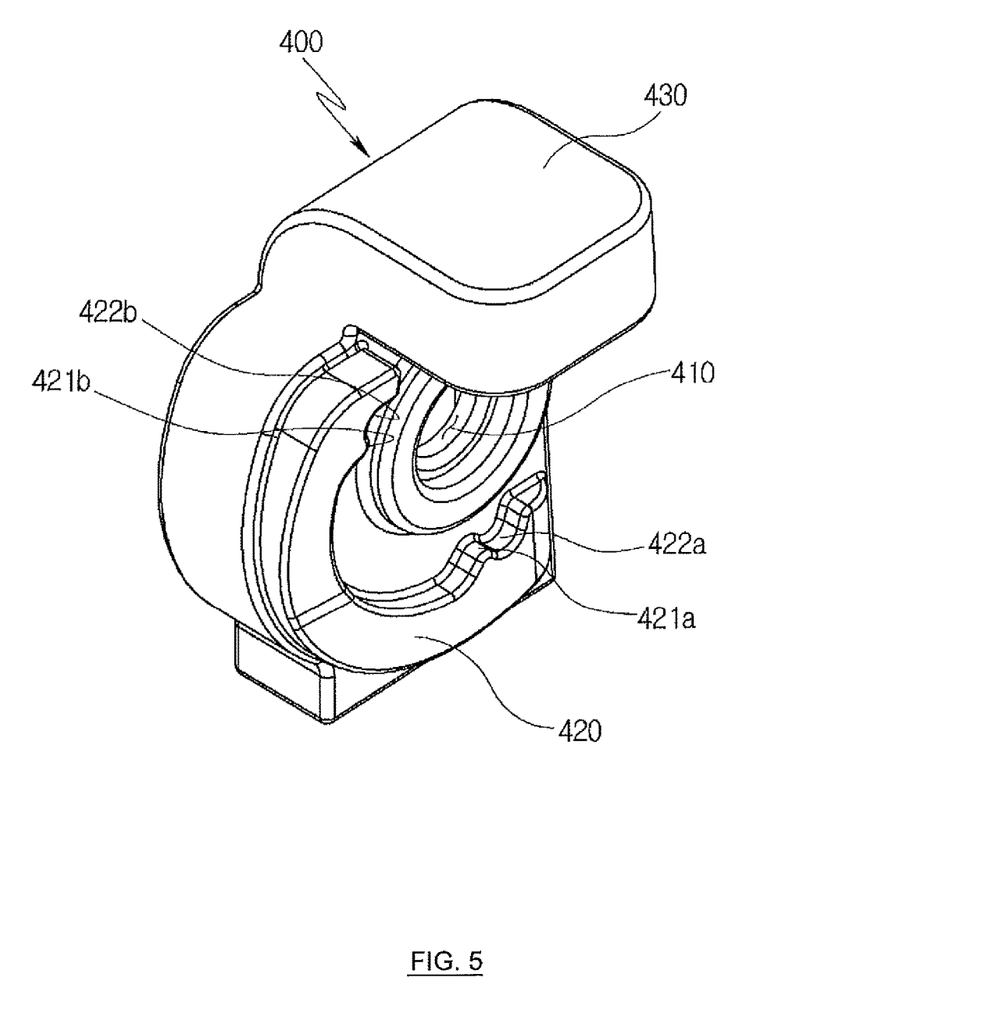
FIG. 5 is an enlarged perspective view of a lower bracket cover illustrated in FIG. 1.
Figure 6A:
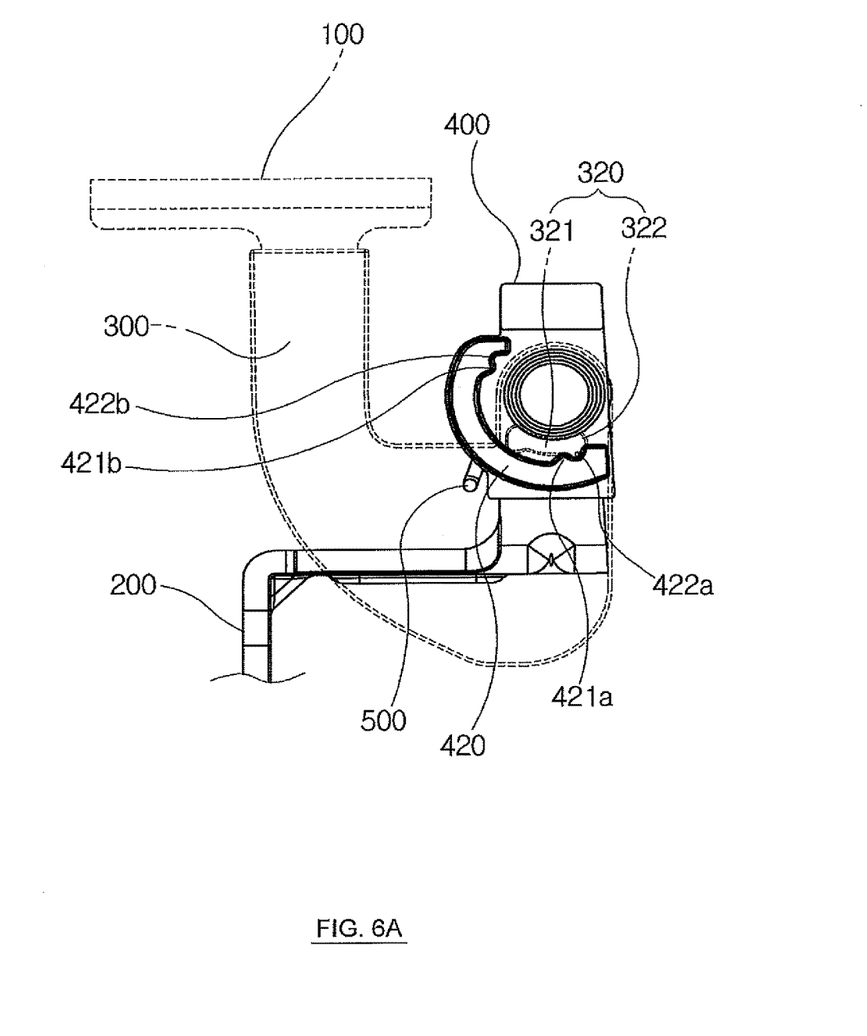
FIGS. 6A, 6B, and 6C are side views illustrating an operation state of a console armrest for a vehicle illustrated in FIG. 1.
Figure 6B:
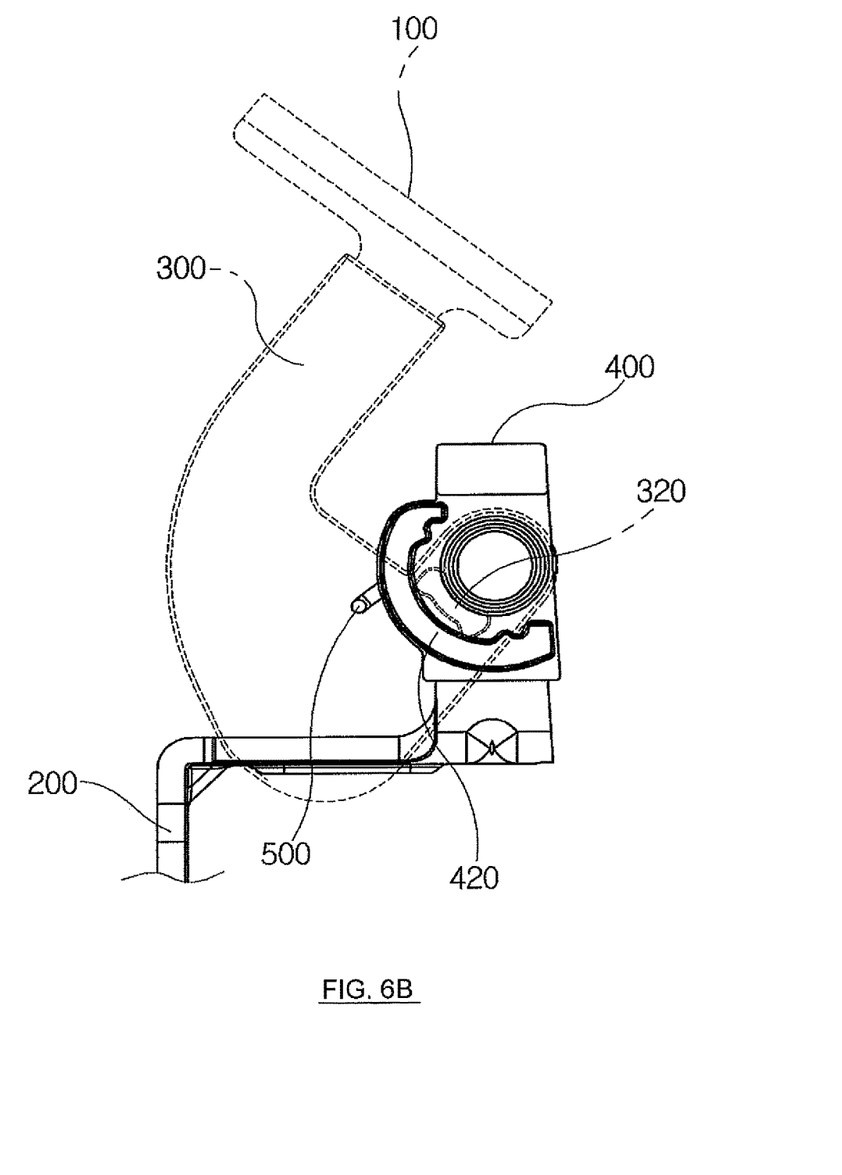
Figure 6C:
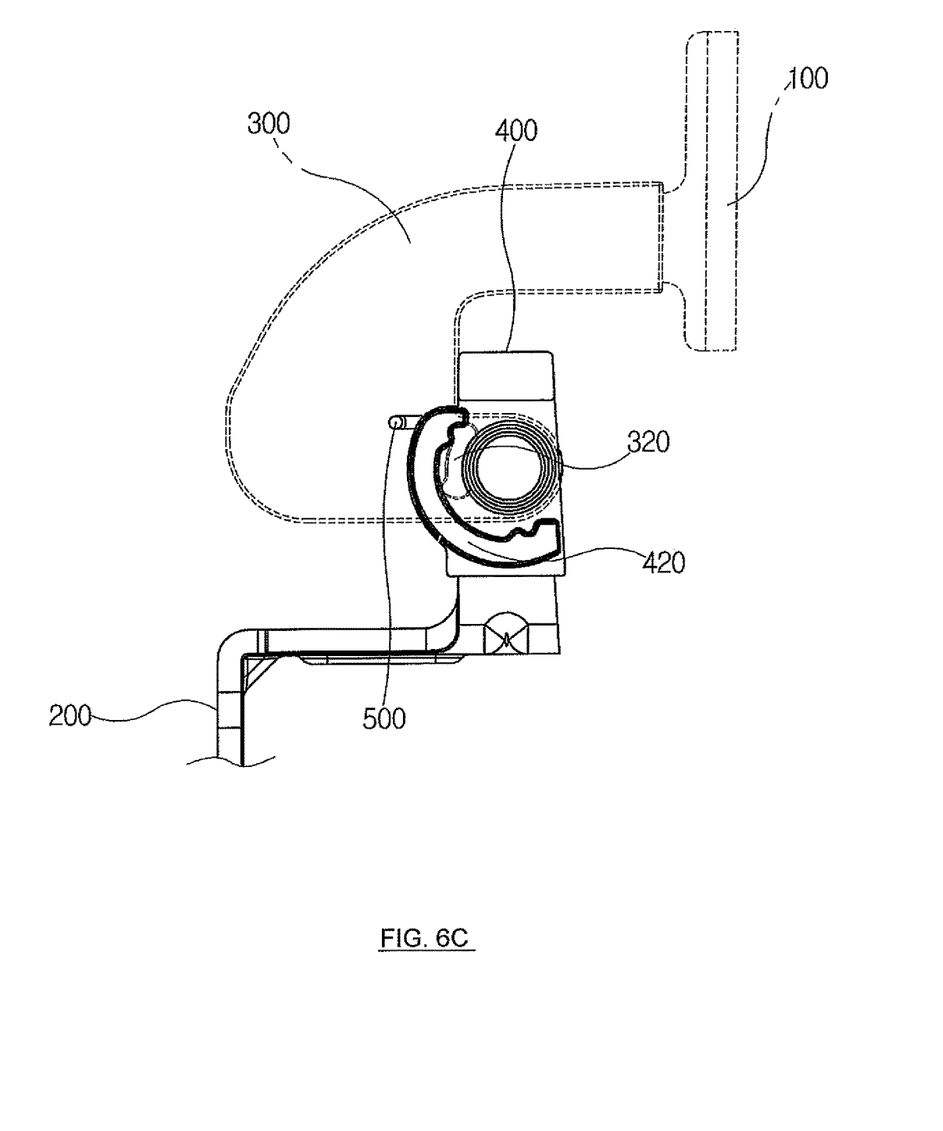
Figure 7:
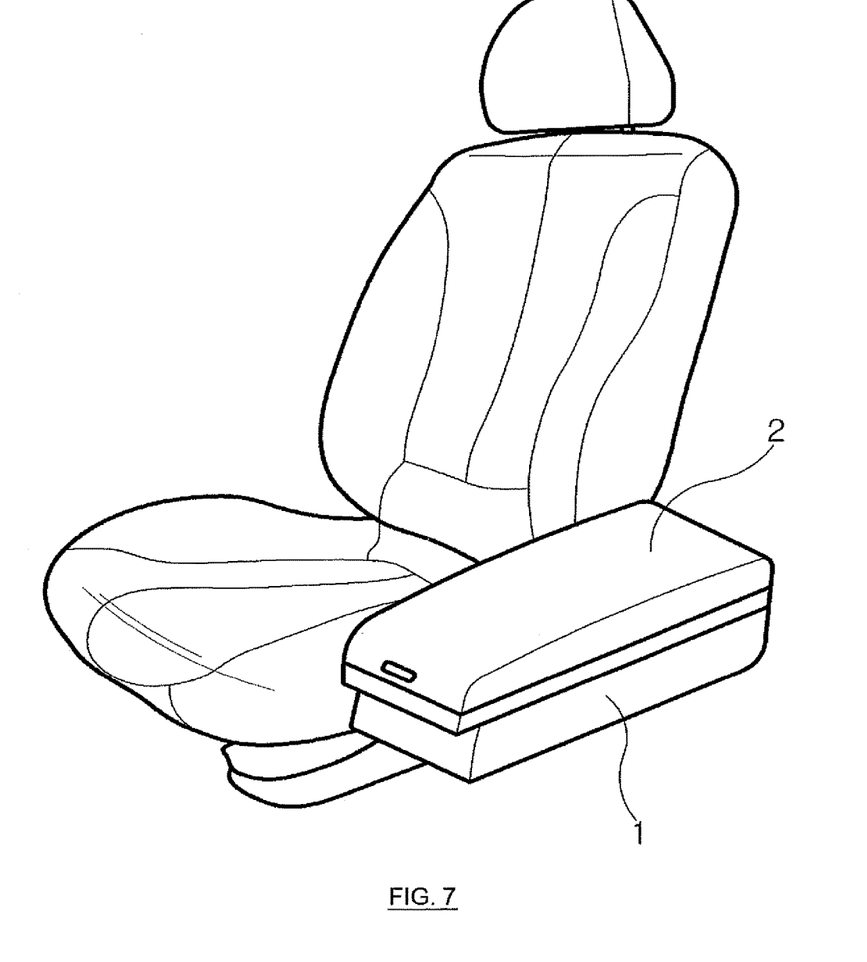
FIG. 7 is a view schematically illustrating an example of a console armrest in which the hinge unit of a console armrest for a vehicle according to the embodiment of the present invention is installed.

FIG. 1 is an exploded perspective view illustrating a hinge unit of a console armrest for a vehicle according to an embodiment of the present invention. FIG. 2 is an assembled perspective view of the hinge unit of a console armrest for a vehicle illustrated in FIG. 1. FIG. 3 is an assembled perspective view of the hinge unit of a console armrest for a vehicle illustrated in FIG. 2 when viewed from a different angle. FIG. 4 is an enlarged perspective view of an upper bracket cover illustrated in FIG. 1. FIG. 5 is an enlarged perspective view of a lower bracket cover illustrated in FIG. 1. FIGS. 6A, 6B, and 6C are side views illustrating an operation state of a console armrest for a vehicle illustrated in FIG. 1. FIG. 7 is a view schematically illustrating an example of a console armrest in which the hinge unit of a console armrest for a vehicle according to the embodiment of the present invention is installed.

Referring to FIGS. 1 to 7, the hinge unit of a console armrest for a vehicle according to the embodiment of the present invention includes an upper bracket 100, a lower bracket 200, upper bracket covers 300, and lower bracket covers 400. In this case, the hinge unit of a console armrest for a vehicle according to the embodiment of the present invention further includes a spring 500.

The upper bracket 100 includes an armrest installation part 110 that is fixedly coupled to an armrest 2, and upper hinge parts 120 that are formed at both sides of the armrest installation part 110 while extending therefrom and that respectively have first upper hinge holes 121 through which a hinge shaft 10 passes.

In this case, the upper bracket 100, which is fixedly coupled to the armrest 2, rotates relative to the lower bracket 200 once a user opens the armrest 2.

The respective upper hinge parts 120 of the upper bracket 100 have first spring fixing holes 122 that are symmetrical.

The upper bracket 100 may be made of a steel material.

The lower bracket 200 includes a console installation part 210 that is fixedly coupled to a console 1, and lower hinge parts 220 that are formed at both sides of the console installation part 210 while extending therefrom and that respectively have first lower hinge holes 221 formed at positions corresponding to the first upper hinge holes 121, the hinge shaft 10 passing through the first lower hinge holes 221.

The lower bracket 200 may be made of a steel material.

The upper bracket covers 300 each surround at least a portion of an associated one of the upper hinge parts 120 of the upper bracket 100, and respectively have second upper hinge holes 310 that are formed at positions corresponding to the first upper hinge holes 121. In this case, the hinge shaft 10 is installed at the same time through the first and second upper hinge holes 121 and 310.

The upper bracket covers 300 are configured to guide the relative rotation between the upper bracket 100 and the lower bracket 200 through contact with the lower bracket covers 400.

In this case, the upper bracket covers 300 may include guide protrusions 320 that protrude toward the lower bracket covers 400, respectively.

It is preferable that each of the guide protrusions 320 be more convex at both ends thereof than the central portion thereof so as to be held in and supported by seating jaws that will be described later. That is, the guide protrusion 320 may consist of a concave portion 321 that forms a central portion, and convex portions 322 that extend to opposite sides from the concave portion 311 while each having a relatively more convex shape than the concave portion 321.

The upper bracket covers 300 have second spring fixing holes 330 that are symmetrically formed at positions corresponding to the first spring fixing holes 122, respectively. The spring 500 is assembled in such a manner that both ends thereof pass through the first spring fixing holes 122 of the upper bracket 100 and the second spring fixing holes 330 of the upper bracket covers 300, and is rotatable along with the rotation of the upper bracket 100.

The upper bracket covers 300 may be made of a plastic or rubber material, thereby reducing abrasion due to contact with the lower bracket covers 400. Here, it can be seen that the most effective way to prevent abrasion is that the upper bracket covers 300 are made of a plastic material for securing their stiffness since they are repeatedly rotated by rotational force applied by the user, and the lower bracket covers 400 are made of a rubber material since they are relatively fixed.

In this case, it is preferable that the upper bracket 100 be made of a steel material as described above, the upper bracket covers 300 be made of a plastic material, and the upper bracket 100 and the upper bracket covers 300 be integrally manufactured by insert molding.

The lower bracket covers 400 each surround at least a portion of an associated one of the lower hinge parts 220 of the lower bracket 200, and respectively have second lower hinge holes 410 that are formed at positions corresponding to the first lower hinge holes 221.

In this case, the hinge shaft 10 is installed at the same time through the first and second upper hinge holes 121 and 310 and the first and second lower hinge holes 221 and 410, thereby enabling the relative rotation between the upper bracket 100 and the lower bracket 200 or between the respective upper bracket covers 300 and the respective lower bracket covers 400. In this case, a fastening ring 20 may be used for fixing the hinge shaft 10.

The lower bracket covers 400 are configured to guide the relative rotation between the upper bracket 100 and the lower bracket 200 through contact with the upper bracket covers 300.

In this case, it is preferable that the lower bracket covers 400 include guide jaws 420 for guiding the guide protrusions 320, respectively, during the rotation of the upper bracket 100.

Preferably, each of the guide jaws 420 has an arc shape that is centered on an associated one of the second lower hinge holes 410, in consideration of the relative rotation between the upper bracket covers 300 and the lower bracket covers 400.

In addition, each of the guide jaws 420 preferably has inclined jaws 421a and 421b formed at both ends thereof such that the user feels that the associated guide protrusion 320 is latched by the inclined jaws 421a and 421b, and seating jaws 422a and 422b that extend from the respective inclined jaws 421a and 421b to seat and support the guide protrusion 320, thereby allowing the upper bracket 100 to be in a fully open state or in a fully closed state, the inclined jaws 421a and 421b being paired with the seating jaws 422a and 422b.

In detail, the seating jaw 422a, which is located at the lower end of the guide jaw 420, seats and supports one of the convex portions 322 of the guide protrusion 320 when the upper bracket 100 is in the fully closed state, as illustrated in FIG. 6A, and the seating jaw 422b, which is located at the upper end of the guide jaw 420, seats and supports the other of the convex portions 322 of the guide protrusion 320 when the upper bracket 100 is in the fully open state, as illustrated in FIG. 6C.

Assuming a case where one of the convex portions 322 of the guide protrusion 320 is located at the seating jaw 422a when the upper bracket 100 is in the fully closed state and a case where the other of the convex portions 322 of the guide protrusion 320 is located at the seating jaw 422b when the upper bracket 100 is in the fully open state, the hinge unit may be configured to form a central angle of 90 degrees by connecting the center of the hinge shaft 10 with the cross-sectional centers of the respective convex portions 322 in both cases. This is to consider that the armrest 2 is generally opened from a horizontal state to a vertical state.

Meanwhile, when the upper bracket 100 is between the fully closed state and the fully open state, both convex portions 322 of the guide protrusion 320 assist in the stable rotation of the upper bracket 100 while being supported by the guide jaw 420, as illustrated in FIG. 6B.

In addition, each of the lower bracket covers 400 may further include a stopper 430 that restrains excessive opening rotational force applied by the user or that restrains the upper bracket 100 from being excessively opened due to rapid acceleration or deceleration of a vehicle.

The lower bracket covers 400 may be made of a plastic or rubber material, thereby reducing abrasion due to contact with the upper bracket covers 300. Here, it can be seen that the most effective way to prevent abrasion is that the lower bracket covers 400 are made of a rubber material since they are relatively fixed, and the upper bracket covers 300 are made of a plastic material for securing their stiffness since they are repeatedly rotated by rotational force applied by the user.

In this case, it is preferable that the lower bracket 200 be made of a steel material as described above, the lower bracket covers 400 be made of a plastic material, and the lower bracket 200 and the lower bracket covers 400 be integrally manufactured by insert molding.

Through the guide structure of the upper and lower bracket covers 300 and 400, it is possible to fundamentally prevent damage to the upper and lower brackets 100 and 200 due to directly friction therebetween and to simultaneously allow the armrest 2 to stably rotate.

The spring 500 is directly or indirectly installed to the hinge shaft 10, and serves to apply primary opening rotational force during the opening of the upper bracket 100.

That is, the spring 500 may be directly installed to the hinge shaft 10, or may also be installed to a rotary guide 30 that prevents deformation of the hinge shaft 10 and guides the rotation thereof.

In this case, it is experimentally checked that the following structure is better suited for user convenience: after the spring 500 applies opening rotational force to the upper bracket 100 and the upper bracket covers 300 up to a primary position illustrated in FIG. 6B, rather than until the armrest 2 is fully opened, the user opens the armrest 2 with her/his force, whereas the spring 500 applies closing rotational force to the upper bracket 100 and the upper bracket covers 300 up to the primary position again when the armrest 2 is closed.

The spring 500 may be provided to be rotatable along with the rotation of the upper bracket 100. That is, the spring 500 is assembled through the first spring fixing holes 122 and the second spring fixing holes 330 of the upper bracket covers 300, so as to be rotatable along with the rotation of the upper bracket 100 and the upper bracket covers 300.

Hereinafter, the operational relationship of the hinge unit of a console armrest for a vehicle according to the embodiment of the present invention will be described, in particular, with reference to FIGS. 6A, 6B, and 6C.

In a case where the armrest 2 is in a fully closed state, as illustrated in FIG. 6A, one of the convex portions 322 of the guide protrusion 320 is supported by the seating jaw 422a that allows the upper bracket 100 to be in the fully closed state.

When the user unlatches and opens the armrest 2, the armrest 2 is in a primary open state as illustrated in FIG. 6B. In this case, as described above, the hinge unit may be configured such that the user feels that one of the convex portions 322 of the guide protrusion 320 is latched by the inclined jaw 421a, and such that the spring 500 serves to apply primary rotational force to the upper bracket 100. In addition, the convex portions 322 of the guide protrusion 320 are supported by the guide jaw 420 and guide the rotation of the upper bracket 100 and the upper bracket cover 300, thereby enabling the armrest 2 to be stably opened.

Subsequently, when opening rotational force is applied to the armrest 2 depending on user's intention, the armrest 2 is in a fully open state as illustrated in FIG. 6C. In a case where the armrest 2 is in the fully open state, the other of the convex portions 322 of the guide protrusion 320 is supported by the seating jaw 422b that allows the upper bracket 100 to be in the fully open state.

In this case, the hinge unit may be configured such that the user feels that the other of the convex portions 322 of the guide protrusion 320 is latched by the inclined jaw 421b, immediately before the upper bracket 100 is in the fully open state. In addition, the stopper 430 of the lower bracket cover 400 strikes the upper bracket cover 300 to restrain excessive opening rotational force applied by the user or to restrain the armrest 2 from being further opened due to rapid acceleration or deceleration of the vehicle.

As described above, the hinge unit of a console armrest for a vehicle according to the embodiment of the present invention enables the upper bracket to stably rotate, can structurally define the limited rotational movement of the upper bracket through the guide structure that functionally allows the upper bracket to be in the fully open/closed state, and can fundamentally prevent an abrasion phenomenon due to the friction between the upper bracket and the lower bracket.

As is apparent from the above description, a hinge unit of a console armrest for a vehicle according to exemplary embodiments of the present invention enables an upper bracket to be pressed against a lower bracket and to stably rotate relative thereto through a guide structure when an armrest is opened.

In addition, the hinge unit of a console armrest for a vehicle according to the exemplary embodiments of the present invention can structurally define limited rotational movement of the upper bracket through a guide structure that functionally allows the upper bracket to be in a fully open/closed state.

Furthermore, the hinge unit of a console armrest for a vehicle according to the exemplary embodiments of the present invention can remarkably reduce an abrasion phenomenon due to friction between the upper bracket and the lower bracket by the adoption of upper and lower bracket covers.

The present invention relates to a hinge unit of a console armrest for a vehicle, and is applicable to industrial fields related to vehicle interior parts.

While the present invention has been described with respect to the specific embodiments, it will be apparent to those skilled in the art that various changes and modifications may be made without departing from the spirit and scope of the invention as defined in the following claims.

What is claimed is:

1. A hinge unit of a console armrest for a vehicle, comprising:
   an upper bracket comprising an armrest installation part fixedly coupled to an armrest, and upper hinge parts formed at both sides of the armrest installation part while extending therefrom, each of the upper hinge parts having a first upper hinge hole through which a hinge shaft passes;
   a lower bracket comprising a console installation part fixedly coupled to a console, and lower hinge parts formed at both sides of the console installation part while extending therefrom, each of the lower hinge parts having a first lower hinge hole formed at a position corresponding to the first upper hinge hole, the hinge shaft passing through the first lower hinge hole;
   an upper bracket cover configured to surround at least a portion of each of the upper hinge parts of the upper bracket and to have a second upper hinge hole formed at a position corresponding to the first upper hinge hole; and
   a lower bracket cover configured to surround at least a portion of each of the lower hinge parts of the lower bracket and to have a second lower hinge hole formed at a position corresponding to the first lower hinge hole,
   wherein the upper bracket cover and the lower bracket cover guide relative rotation between the upper bracket and the lower bracket while coming into contact with each other.

2. The hinge unit according to claim 1, wherein:
   the upper bracket cover comprises a guide protrusion protruding toward the lower bracket cover; and
   the lower bracket cover comprises a guide jaw for guiding the guide protrusion during the rotation of the upper bracket.

3. The hinge unit according to claim 2, wherein the guide jaw has an arc shape that is centered on the second lower hinge hole.

4. The hinge unit according to claim 2, wherein the guide jaw comprises inclined jaws formed at both ends thereof such that a user feels that the guide protrusion is latched by the inclined jaws, and seating jaws extending from the respective inclined jaws to seat and support the guide protrusion, thereby allowing the upper bracket to be in a fully open state or in a fully closed state, the inclined jaws being paired with the seating jaws.

5. The hinge unit according to claim 4, wherein the guide protrusion is more convex at both ends thereof than a central portion thereof so as to be held in and supported by the seating jaws.

6. The hinge unit according to claim 1, further comprising a spring directly or indirectly installed to the hinge shaft to apply opening rotational force during opening of the upper bracket.

7. The hinge unit according to claim 6, wherein the spring is rotatable along with the rotation of the upper bracket.

8. The hinge unit according to claim 7, wherein:
   the respective upper hinge parts of the upper bracket have first spring fixing holes that are symmetrical, and the respective upper bracket covers have second spring fixing holes that are symmetrically formed at positions corresponding to the first spring fixing holes; and
   the spring is assembled in such a manner that both ends thereof pass through the first and second spring fixing holes.

9. The hinge unit according to claim 1, wherein the upper bracket is made of a steel material, the upper bracket cover is made of a plastic material, and the upper bracket and the upper bracket cover are integrally manufactured by insert molding.

10. The hinge unit according to claim 1, wherein the lower bracket is made of a steel material, the lower bracket cover is made of a rubber material, and the lower bracket and the lower bracket cover are integrally manufactured by insert molding.

* * * * *